(12) United States Patent
Safwat

(10) Patent No.: US 7,240,453 B1
(45) Date of Patent: Jul. 10, 2007

(54) BIOELECTRIC SIMULATING FISHOOK AND LURE AND METHOD OF USING SAME

(76) Inventor: Sherif Safwat, 1925 Donner Ave., Unit no. 3, Davis, CA (US) 95616

(*) Notice: Subject to any disclaimer, the term of this patent is extended or adjusted under 35 U.S.C. 154(b) by 949 days.

(21) Appl. No.: 09/674,443

(22) PCT Filed: Apr. 30, 1999

(86) PCT No.: PCT/US99/09506

§ 371 (c)(1),
(2), (4) Date: Oct. 27, 2000

(87) PCT Pub. No.: WO99/55150

PCT Pub. Date: Nov. 4, 1999

Related U.S. Application Data

(60) Provisional application No. 60/083,721, filed on Apr. 30, 1998, provisional application No. 60/098,242, filed on Aug. 29, 1998.

(51) Int. Cl.
*A01K 79/02* (2006.01)
(52) U.S. Cl. .................................................. 43/17.1
(58) Field of Classification Search ................ 43/17.1
See application file for complete search history.

(56) References Cited

U.S. PATENT DOCUMENTS

| | | | | |
|---|---|---|---|---|
| 1,838,981 A | * | 12/1931 | Anderson | ............... 43/17.1 |
| 4,715,142 A | * | 12/1987 | Richard | ............... 43/43.16 |
| 4,827,656 A | * | 5/1989 | Ohnishi | ............... 43/34 |
| 4,893,430 A | * | 1/1990 | Barfield | ............... 43/42.24 |
| 4,922,645 A | * | 5/1990 | Hannon et al. | ............... 43/42.4 |
| 4,970,808 A | * | 11/1990 | Massie | ............... 43/17.1 |
| 5,159,773 A | * | 11/1992 | Gentry | ............... 43/17.1 |
| 5,175,950 A | * | 1/1993 | Linder | ............... 43/17.1 |
| 5,203,103 A | * | 4/1993 | Hawley | ............... 43/17.1 |
| 5,406,734 A | * | 4/1995 | Ho | ............... 43/17.1 |
| 5,697,182 A | * | 12/1997 | Rodgers | ............... 43/17.1 |

* cited by examiner

*Primary Examiner*—Kurt Rowan
(74) *Attorney, Agent, or Firm*—Donald E. Schreiber

(57) ABSTRACT

Fishhooks (20), artificial lures (23, 35, 65, 67 and 91) or trailer rods (120) include both an anodic segment (25, 85 and 105) and a cathodic segment (27). The anodic and cathodic segments (25, 85, 105 and 27) are arranged so that immersion of fishhooks (20), artificial lures (23, 35, 65, 67 and 91) or trailer rods (120) in water establishes a galvanic cell that generates an electo-magnetic field which simulates the natural bioelectric field of living prey. A particularly preferred embodiment of the present invention interposes an insulated segment (29) between the anodic and cathodic segments (25, 85, 105 and 27) of fishhooks (20), artificial lures (23, 35, 65, 67 and 91). While galvanic action occurs between the anodic and cathodic segments, fishhooks (20) and artificial lures (23, 35, 65, 67 and 91) and trailer rods (120) in accordance with the present invention establish a constant, bioelectric simulating electromagnetic field.

47 Claims, 7 Drawing Sheets

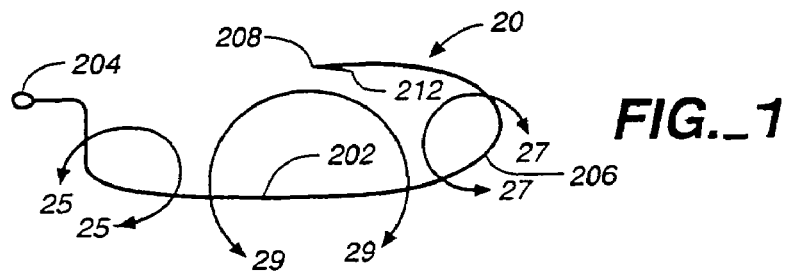
FIG._1
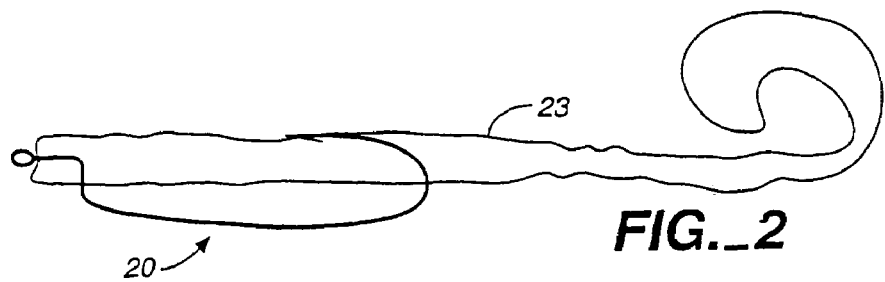
FIG._2
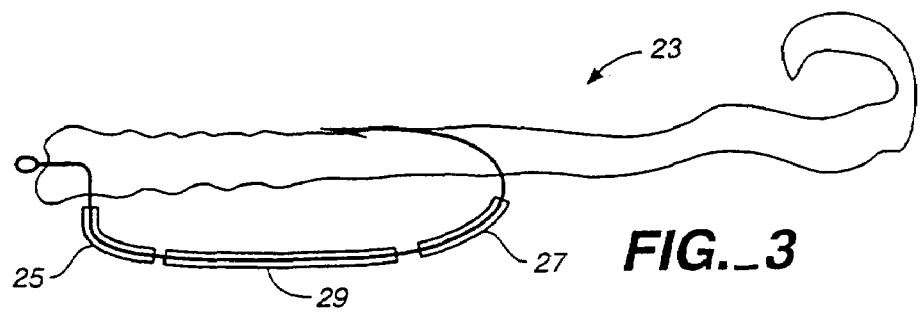
FIG._3
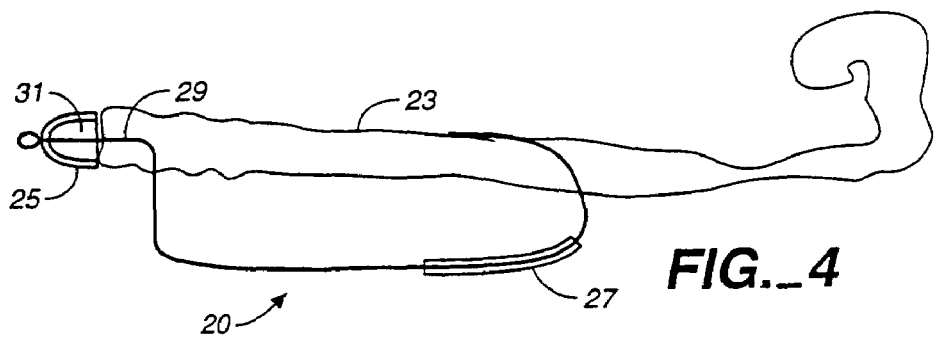
FIG._4
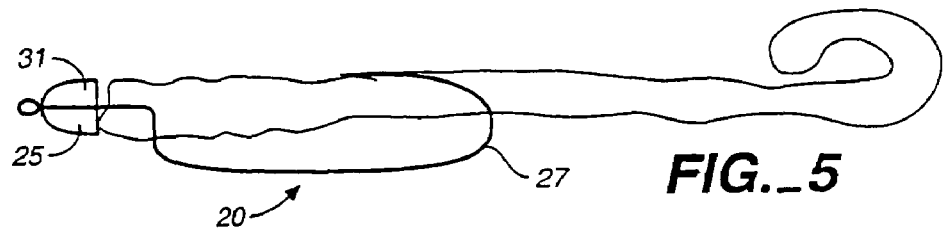
FIG._5

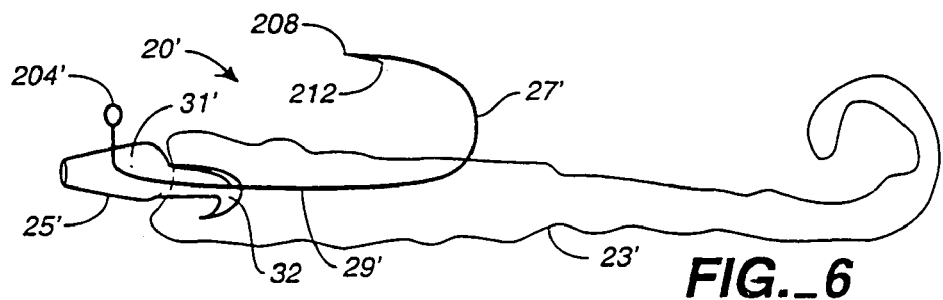
FIG._6
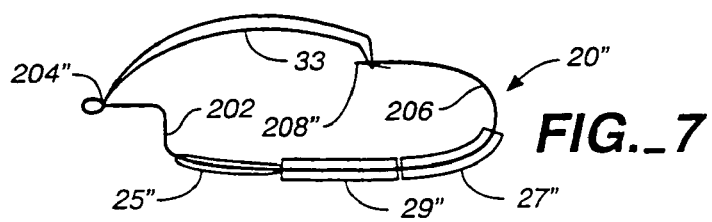
FIG._7
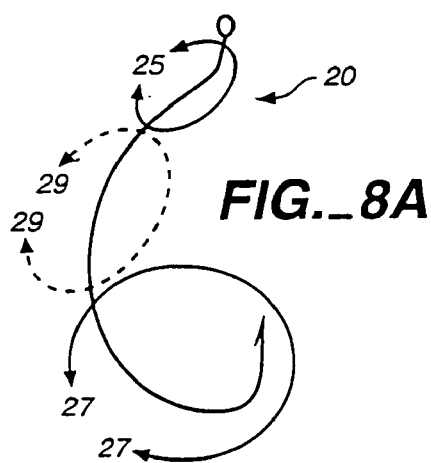
FIG._8A
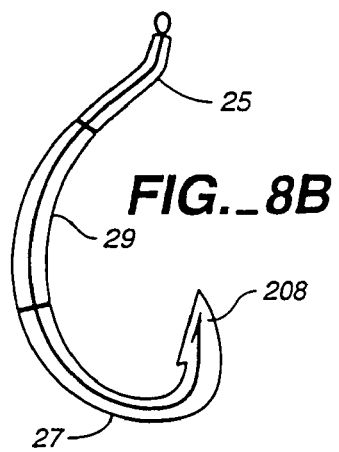
FIG._8B
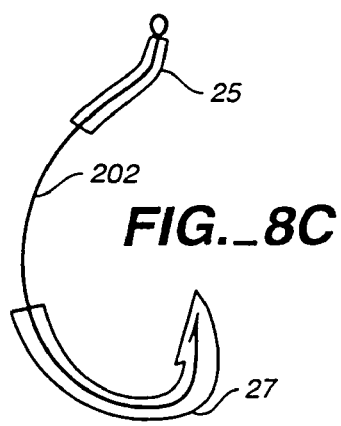
FIG._8C
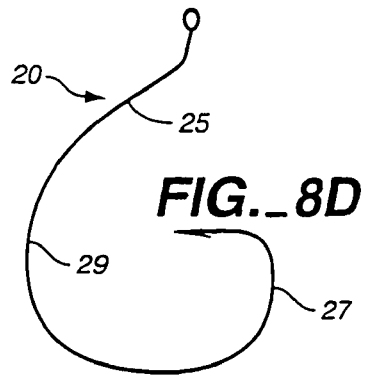
FIG._8D

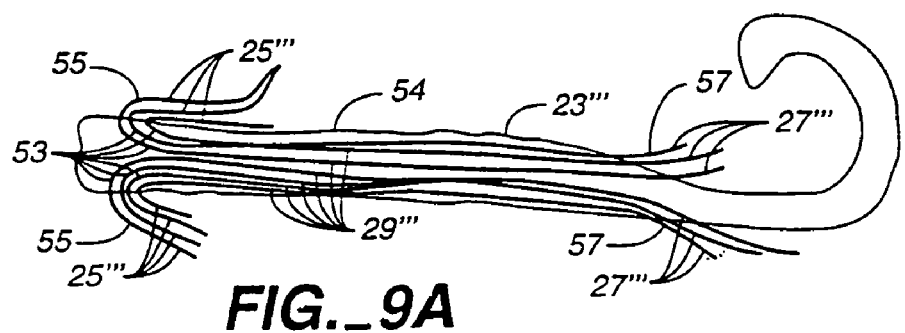
FIG._9A
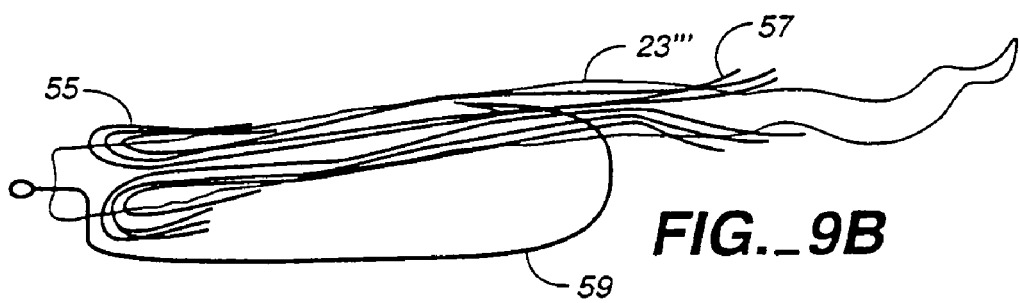
FIG._9B
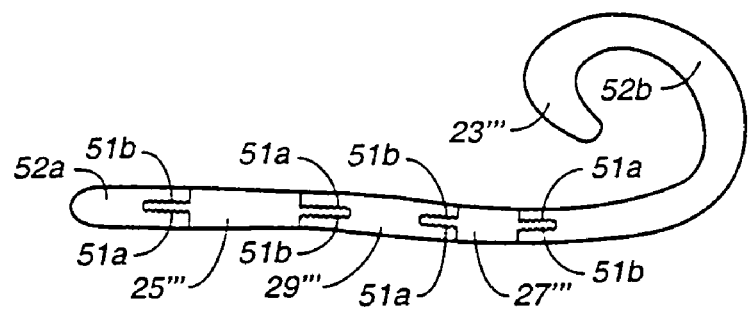
FIG._9C
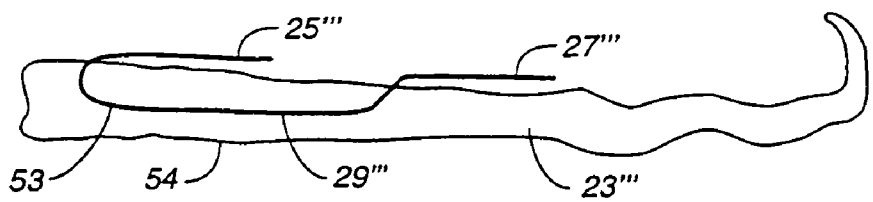
FIG._10

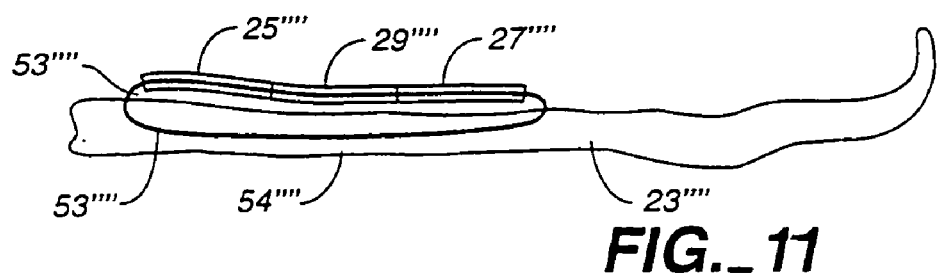
FIG._11
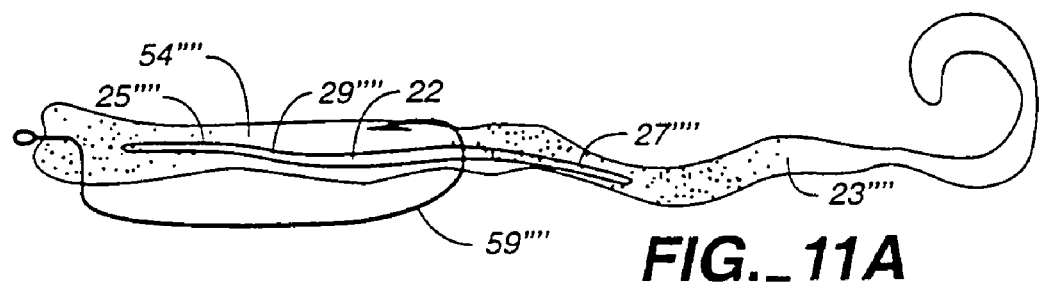
FIG._11A
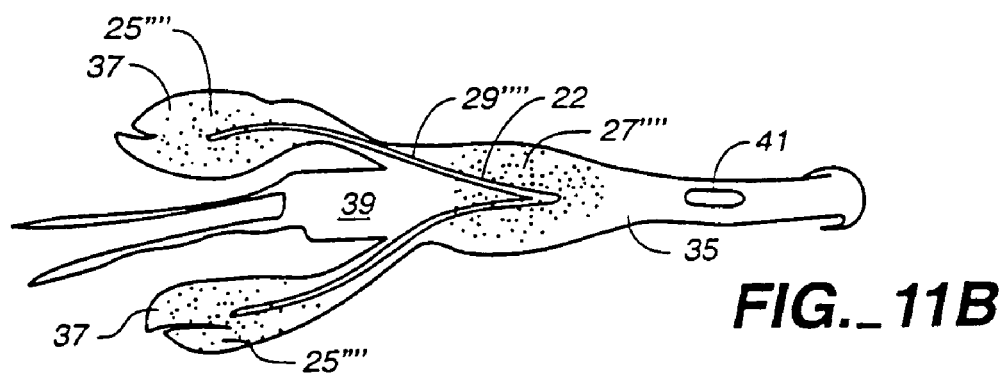
FIG._11B
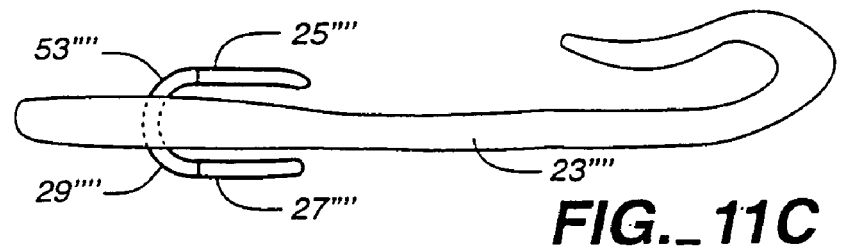
FIG._11C

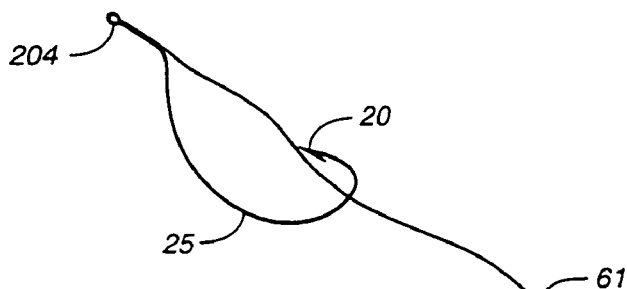
FIG._12A
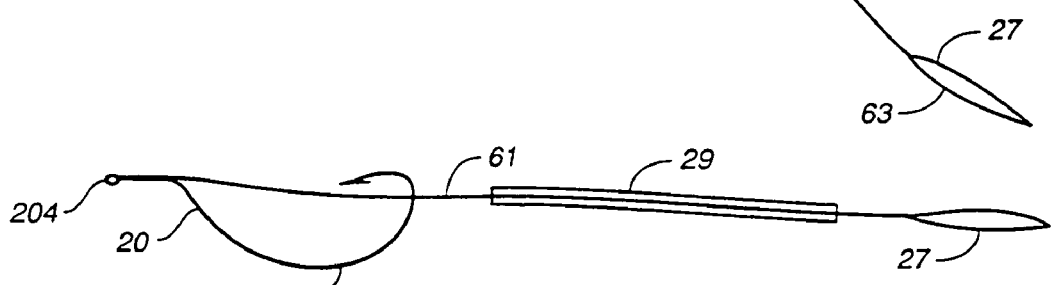
FIG._12B
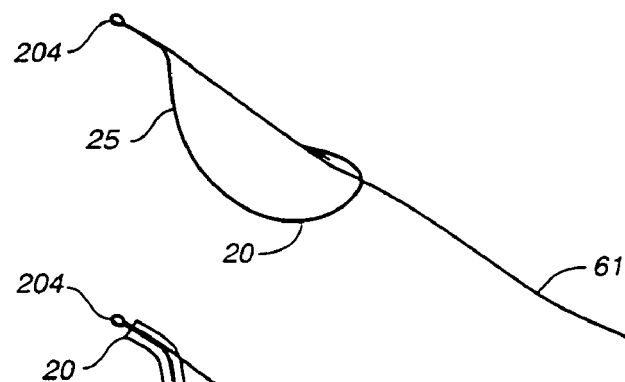
FIG._12C
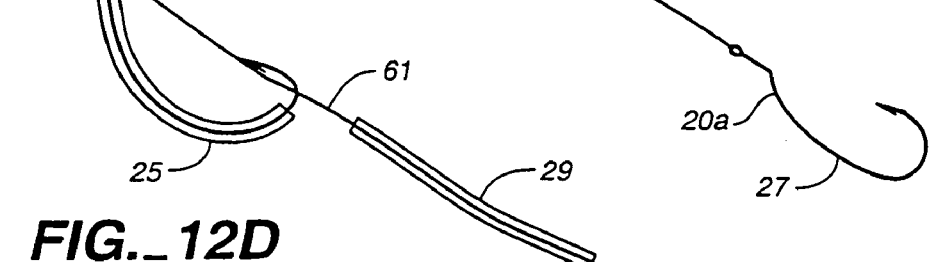
FIG._12D
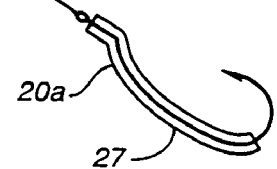

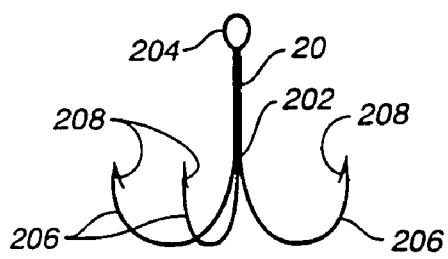
FIG._13A
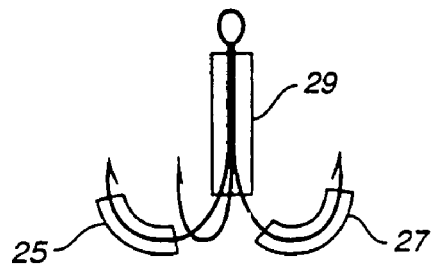
FIG._13B
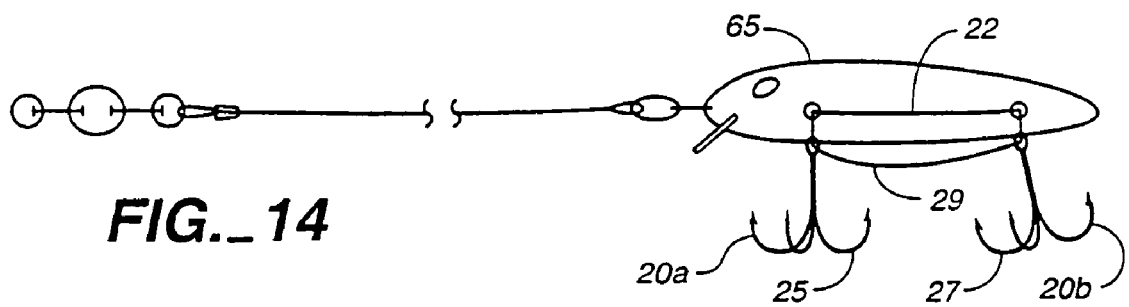
FIG._14
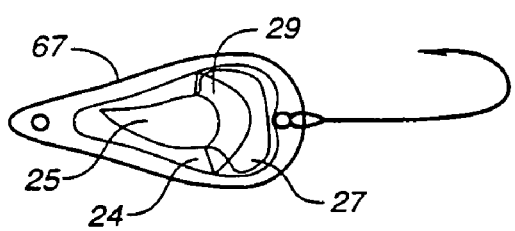
FIG._15
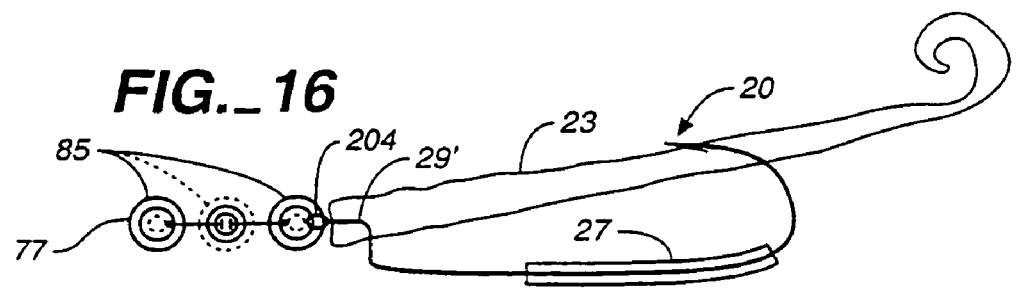
FIG._16

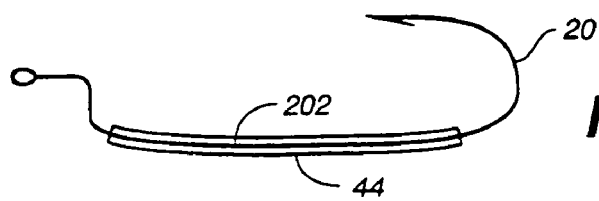
FIG._17
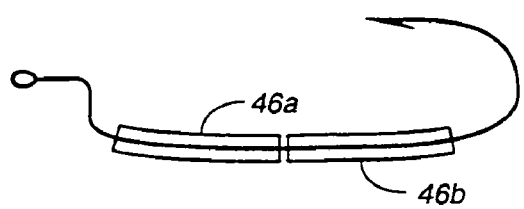
FIG._17A
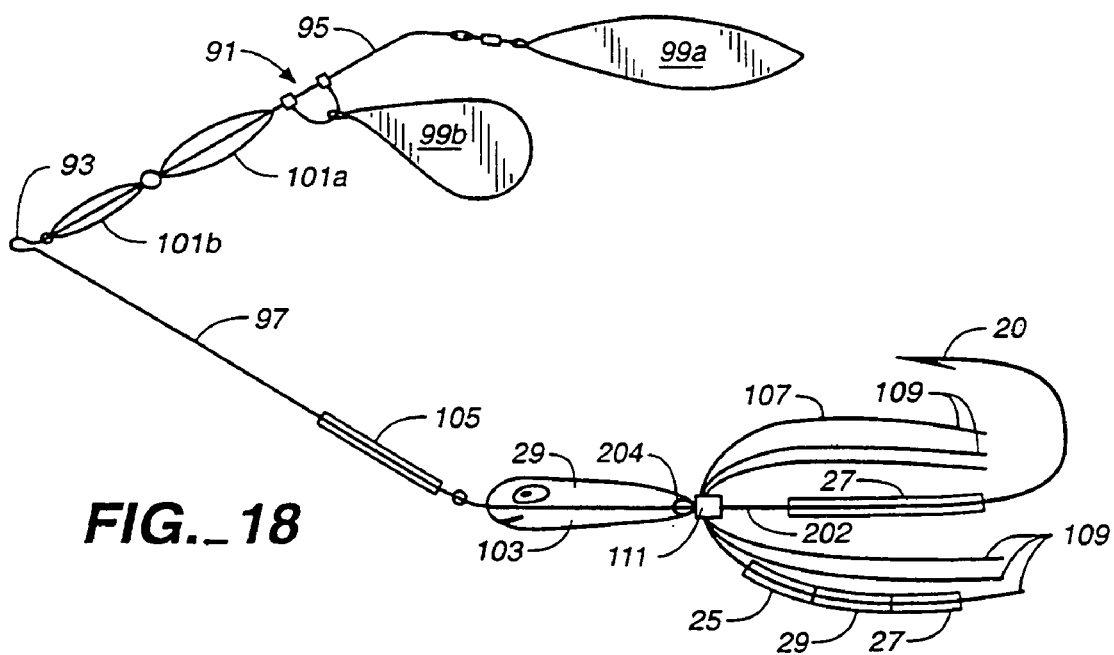
FIG._18
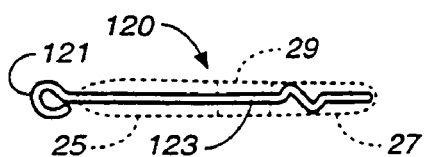
FIG._19A
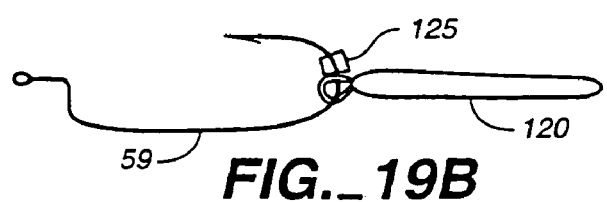
FIG._19B

BIOELECTRIC SIMULATING FISHHOOK AND LURE AND METHOD OF USING SAME

This is a national stage entry of PCT/US99/09506 having an International Filing Date of Apr. 30, 1999 which claims priority from Provisional Application 60/083,721 filed Apr. 30, 1998 and Provisional Application 60/098,242 filed Aug. 29, 1998.

TECHNICAL FIELD

The present invention relates generally to the technical field of fishing and, more particularly, to fishhooks and artificial fishing lures.

BACKGROUND ART

Mankind has, from prehistoric times to the present, fished both for sustenance and for pleasure. Throughout that interval, diverse devices have been developed to improve various different aspects of fishing. For example, U.S. Pat. No. 4,715,142 entitled "Self-Destruct Fish Hook" discloses a fishhook that has a selected small anodic area of exposed steel, and a highly cathodic plating covering a much larger area of the fishhook's surface. When immersed in seawater, the resulting galvanic couple causes the small anodic area to corrode rapidly so the fishhook eventually breaks. In a preferred embodiment, a coating covers either the anodic area or the cathodic plating to delay the onset of corrosion at the anodic area. Thus, when immersed in seawater this preferred fishhook retains 100 percent of its mechanical strength for a substantial usage interval before the steel body begins corroding.

Similarly, U.S. Pat. No. 4,970,808 entitled "Electro-Acoustical Fishing Lure" ("the '808 patent") discloses that it has been long known that electrical pulses and sonic waves attract fish. It is also known that at least some fish, for example catfish, employ bioelectric detection in hunting their prey. FIG. 1 of the '800 patent depicts a lure having fluttering, electro-acoustical electrodes that are suspended parallel to a fixed electrode. The fluttering electrodes have one electrode potential while the fixed electrode has a different electrode potential. The fluttering electrodes are attached to the fixed electrode by an insulator fitting and rings.

Because the differing potentials between the fixed electrode and the fluttering electrodes when immersed in water electrolyte allegedly establish a voltaic cell, the '808 patent asserts that such electrodes separated both by the electrolyte and by the insulator fitting provide a fairly constant emf while delivering an electrical current to an outside load. Thus, upon drawing the lure through the water the fluttering electrodes discharge a momentary electrical current pulse when they collide with the fixed electrode. Collisions between either fluttering electrode and the fixed electrode also transmit an acoustical wave into the water concurrent with the alleged electrical current pulse discharge. Thus, the fishing lure disclosed in this patent allegedly simultaneously introduces both electrical pulses and sonic waves into the water.

DISCLOSURE OF INVENTION

The present invention provides an electro-magnetic field about a fishhook or artificial lure that induces a strike response in fish.

An object of the present invention is to provide bioelectric simulating fishhooks and artificial lures.

Another object of the present invention is to provide fishhooks and artificial lures which upon immersion in water generate an electro-magnetic field which simulates the natural bioelectric field of living prey which sport fish employ in detecting the fishhook or artificial lure, convincing the fish that the fishhook or artificial lure is a live and viable prey, and inducing a violent strike response.

Another object of the present invention is to provide fishhooks and artificial lures which upon immersion in water employ galvanic action to generate an electromagnetic field which simulates the natural bioelectric field of living prey.

Briefly, the present invention in a preferred embodiment is a fishhook or artificial lure that includes both an anodic segment, formed by an anodic material, and a cathodic segment, formed by a cathodic material. The anodic and cathodic segments are arranged so that immersion of the fishhook or artificial lure in water establishes a galvanic cell that generates an electro-magnetic field which simulates the natural bioelectric field of living prey. A particularly preferred embodiment of the present invention interposes an insulated segment between the anodic and cathodic segments of fishhooks and artificial lures. While galvanic action occurs between the anodic and cathodic segments, fishhooks and lures in accordance with the present invention establish a constant, bioelectric simulating electromagnetic field.

These and other features, objects and advantages will be understood or apparent to those of ordinary skill in the art from the following detailed description of the preferred embodiment as illustrated in the various drawing figures.

BRIEF DESCRIPTION OF DRAWINGS

FIG. 1 is a plan view illustrating a bioelectric simulating fishhook in accordance with the present invention;

FIG. 2 is a plan view illustrating the fishhook of FIG. 1 conventionally rigged with a rubber worm;

FIG. 3 is a plan view illustrating the fishhook of FIGS. 1 and 2 depicted with greatly exaggerated outlines for coated or treated segments thereof;

FIG. 4 is a plan view illustrating an alternative embodiment of the present invention to the fishhook as depicted in FIG. 3 which replaces an insulating segment thereof with an insulating artificial lure;

FIG. 5 is a plan view illustrating the fishhook depicted in FIG. 4 that omits the greatly exaggerated outlines of anodic and cathodic coated segments;

FIG. 6 is a plan view illustrating an alternative embodiment of the present invention to the fishhook of FIGS. 1-3 which includes a weighted and enlarged forward segment;

FIG. 7 is a plan view illustrating an alternative embodiment of the present invention to the fishhook of FIGS. 1-3 having a wire or plastic weed guard;

FIG. 8a is a plan view illustrating a basic bait fishhook in accordance with the present invention;

FIG. 8b is a plan view illustrating the basic bait fishhook of FIG. 8a depicted with greatly exaggerated outlines for coated or treated segments thereof;

FIG. 8c is a plan view illustrating an alternative embodiment of the basic bait fishhook of FIG. 8a which omits the insulating segment thereof;

FIG. 8d is a plan view illustrating an alternative embodiment of the basic bait fishhook of FIG. 8a formed as a circle fishhook such as is widely used in commercial long-line fishing;

FIG. 9a is a plan view illustrating an alternative embodiment of the present invention in the form of a artificial lure, such as a rubber worm artificial lure, from which protrude numerous fine, hairlike conductive strands that provide anodic segments in accordance with the present invention;

FIG. 9b is a plan view illustrating the rubber worm artificial lure of FIG. 9 with the fine, hairlike conductive strands laying against the rubber worm as is likely to occur as the artificial lure moves through the water especially during retrieval;

FIG. 9c is a plan view illustrating an alternative embodiment of the present invention in the form of a artificial lure, such as a rubber worm artificial lure, formed by mechanically coupled sections respectively for the anodic, cathodic, and insulated segments;

FIG. 10 is a plan view illustrating an alternative embodiment of the artificial lure depicted in FIGS. 9a and 9b wherein the fine, hairlike conductive strands are secured to the insulating rubber body of the artificial lure and provide both the anodic and cathodic segments in accordance with the present invention;

FIG. 11 is a plan view illustrating an alternative embodiment of the artificial lure depicted in FIGS. 9a and 9b wherein the fine, hairlike conductive strands are made as a spear that is pierced by or tied about the insulating artificial lure or bait;

FIG. 11a is a plan view illustrating an alternative embodiment of the artificial lure depicted in FIGS. 9a and 9b wherein pores in the insulating body of the artificial lure receive anodic and cathodic material which are interconnected either by a conductive polymeric material or by a metal strand or wire;

FIG. 11b is a plan view illustrating a crayfish-shaped artificial lure having porous material for the artificial lure's claws which carry anodic material and the body of which carries cathodic material;

FIG. 11c is a plan view illustrating an alternative embodiment of the artificial lure depicted in FIGS. 11 wherein the strand or strands are formed into a U-shaped spear;

FIGS. 12a-12d are plan views illustrating embodiments of arrangements for fishhooks or artificial lures in accordance with the present invention that provide a larger separation for anodic and cathodic segments than the separation depicted for prior embodiments;

FIG. 13a is a plan view illustrating a fishhook that includes several individual shanks, bends, points and barbs, in this case a treble fishhook, in accordance with the present invention;

FIG. 13b is a plan view illustrating the fishhook of FIG. 13a depicted with greatly exaggerated outlines for coated or treated segments thereof;

FIG. 14 is a plan view illustrating a stick type artificial lure that includes a hard-body artificial lure having a pair of treble fishhooks each in accordance with the present invention;

FIG. 15 is a plan view illustrating a bioelectric simulating spoon type artificial lure in accordance with the present invention;

FIG. 16 is a plan view illustrating extension hardware that includes a swivel which forms a portion of the bioelectric simulating fishhook in accordance with the present invention;

FIG. 17 is a plan view illustrating an alternative embodiment fishhook in accordance with the present invention, similar to the fishhook depicted in FIG. 1, in which the segments are replaced by an electret, polymer battery, or magnet;

FIG. 17a is a plan view illustrating an alternative embodiment fishhook in accordance with the present invention conventionally rigged with a rubber worm, similar to the fishhook depicted in FIG. 2, in which the segments are replaced by an electret, polymer battery, or magnet;

FIG. 18 is a plan view illustrating a spinner lure that includes blade spoons, a jig head, and an interchangeable skirt all in accordance with the present invention;

FIG. 19a is a plan view illustrating a trailer rod in accordance with the present invention that is secured to a bend of a conventional fishhook; and FIG. 19b is a plan view illustrating a conventional fishhook rigged with the trailer rod depicted in FIG. 19a.

BEST MODE FOR CARRYING OUT THE INVENTION

FIG. 1 illustrates a fishhook in accordance with the present invention indicated by the general reference character 20. The fishhook 20 has a conventional shape including a shank 202 having an eye 204 formed at one end thereof. The eye 204 permits securing the fishhook 20 to a fishing line or to other fishing gear not illustrated in FIG. 1. The fishhook 20 includes a bend 206 located at an end of the shank 202 furthest from the eye 204. An end of the bend 206 furthest from the shank 202 is formed with a point 208 that may include a barb 212. The fishhook 20 depicted in FIG. 1 is typical of a type of fishhook that may be used for fishing with rubber or artificial worms, rubber lizards, rubber crawfish, or other rubber or other artificial lures. Thus, the fishhook 20 of the present invention includes a conventionally constructed fishhook, such as may be composed of steel, that has been further treated in accordance with the present invention to provide a self-contained bioelectric simulating means for producing an electro-magnetic field about the fishhook to induce a strike response in fish.

The fishhook 20 has a minimum necessary wire diameter which wire is preferably of uniform diameter and composition throughout the lengths of the shank 202 and the bend 206, i.e. from the barb 212 to and including the eye 204. The minimum necessary wire diameter is commonly a wire diameter that ensures the integrity of the fishhook 20 during normal use, such as strong fishhook sets and fighting fish intended to be caught with and landable with the fishhook 20, or within the breaking strength of fishing lines most commonly used. FIG. 2 illustrates the fishhook 20 of FIG. 1 conventionally rigged with an artificial rubber worm 23. Accordingly, the fishhook 20 depicted in FIG. 2 is a rubber worm fishhook.

The fishhook 20 of the present invention differs from conventional fishhooks by including an anodic segment 25 indicated by a curved, arrowed line in FIG. 1, a cathodic segment 27 indicated by a curved, arrowed line in FIG. 1, and preferably an insulated segment 29 also indicated by a curved, arrowed line in FIG. 1. The anodic segment 25 is preferably formed by including in the shank 202 an anodic material such as zinc, magnesium, or an alloy having a high magnesium zinc content. The cathodic segment 27 is preferably formed by including in the bend 206 a cathodic material such as graphite or graphitized cast iron. The insulated segment 29 is preferably formed by coating the shank 202 with a water-insoluble, electrically-insulating material such as teflon or similar polymeric material, enamel, a suitable paint, or any other coatable, electrically insulating material, for example rubber. To facilitate illustration of the structure of the fishhook 20, FIG. 3 depicts the fishhook 20 of FIGS. 1 and 2 with greatly exaggerated outlines for the anodic, cathodic, and insulated segments 25, 27 and 29. Upon immersion of the fishhook 20 into water, the fishhook 20 of the present invention generates an electric field that simulates the bioelectric field associated with natural, living prey.

The anodic segment 25 of fishhook 20 may be formed by various materials which may be applied or made part of the fishhook 20 in variety of ways. Presently, a magnesium or zinc coating, or a coating having a high magnesium or zinc content is preferred. Such a coating may be applied in various ways including dipping, hot dipping, painting, spraying, or other coating such as by electro-deposition including electroplating. However, other less preferable, alternative means and methods for establishing the anodic segment 25 are readily apparent. Such alternative means include wrapping the shank 202 with a fine wire or tape made out of or coated with the selected anodic material, or by crimping or otherwise attaching to the shank 202 something formed from the preferred anodic containing material such as a magnesium or zinc coated lead or tin split shot, or a magnesium or zinc element or coated piece of conductive plastic or metal foil that is crimped or stamped onto shank 202 to form anodic segment 25. Similarly, a tape, having an electrically conductive connection to the shank 202, that is coated with a magnesium or zinc containing material may be secured thereto.

Analogously, the cathodic segment 27 may be applied to the bend 206 in various different ways such as by spraying or hot dipping or electroplating graphite or graphitized cast iron onto the body of fishhook 20. Alternatively, graphite pieces or particles may be mechanically or adhesively secured to the bend 206 to establish the cathodic segment 27. In an analogous manner the insulated segment 29 may be established by painting or dipping an enamel or plastic coating onto the appropriate portion of the shank 202. The same methods of applying or treating the anodic segment 25 may, in many instances, also be used for forming the cathodic and insulated segments 27 and 29 of the fishhook 20. However, dipping, spraying or molding are preferred for the cathodic segment 27, particularly if the cathodic segment 27 contains graphite as its main cathodic material because of the difficulty of applying a graphite coating using other techniques.

Furthermore, while magnesium or zinc containing materials are presently preferred as the anodic materials for anodic segment 25, and while graphite or graphitized cast iron are presently preferred as the cathodic materials for cathodic segment 27, other anodic and cathodic materials that produce an anodic and cathodic couple upon immersion in water may also be used in practicing the present invention.

In selecting an anodic material and a cathodic material for the fishhook 20, especially in the cases of a conventional fishhook further treated in accordance with the present invention, factors to be considered include; the composition of the material to which the anodic and cathodic segments 25 and 27 are applied; whether the fishhook 20 is to be used in salt or fresh water; the compatibility of other material included in the fishhook 20 with various anodic and cathodic materials that form the anodic and cathodic segments 25 and 27; as well as the probable galvanic behavior of the anodic and cathodic couples, including their potential galvanic behavior in relationship with the relative proportions of anodic and cathodic materials. In the presently preferred embodiment it appears that a smaller proportion of anodic material relative to the cathodic material is preferred for increasing the duration of the simulated bioelectric effect. Conversely, if the fishhook 20 is to have a long life, then the cathodic segment 27 preferably comprises a smaller molar volume and/or surface area of galvanically reactive material than does the anodic segment 25.

The precise design and also the precise shape of any particular fishhook 20 is preferably adapted to and varies depending upon its intended environment of use, i.e. salt or fresh water, murky or clear water, the composition of untreated portions if a conventional fishhook is further treated in accordance with the present invention, and even the sensory organs and preying habits of the intended fish species. In anticipating the design of a fishhook 20 in accordance with the present invention for use in a particular environment, publications on the likely behavior of galvanic couples, as may be found in marine engineering books, assist in selecting possible anodic and cathodic materials. Such references generally also include information relating to the composition of any untreated portions of the fishhook 20, and to selection of the relative proportions of anodic and cathodic materials. As suggested in U.S. Pat. No. 5,373,728 entitled "Galvanic Anode Device and Electrolysis Control Monitor," in the presently preferred embodiment it appears that a magnesium alloy or magnesium containing material is the preferred anodic material for fresh water applications, though favorable results have been obtained with fishhooks 20 coated with zinc. A zinc alloy or zinc containing material appears to be a preferred anodic material for use in salt water.

The selection of the anodic and cathodic materials and couples, their relative amounts, their behavior in relation to the composition of any untreated portion of the fishhook, and their environment of use are primary factors responsible for the degree of simulated bioelectric activity. Other factors being properly considered, such as the nature of the composition of any untreated portion of the fishhook, and the environment of use, i.e. salty or fresh water, the selection of the anodic material relative to the cathodic material also influence the extent of the electro-magnetic field establishing the simulated bioelectric field. In some instances, if fishhook life is not a significant consideration it is anticipated that the material selected for the shank 202 and eye 204 may permit an untreated portion of the fishhook to function as either the anodic or cathodic segment 25 or 27. In some instances, it is anticipated that the insulated segment 29 may be omitted, particularly if an insulating lure is secured to the fishhook 20 as depicted in FIGS. 4 and 5. In such instances, the position of the anodic and cathodic segments 25 and 27 should allow them to contact water after the lure has been placed suitably onto the fishhook 20.

If the anodic and cathodic segments 25 and 27 in accordance with the present invention are applied to a conventional fishhook, it is further anticipated that portions thereof which are not between the anodic segment 25 and the cathodic segment 27 may as well be coated with an insulating material to prevent reaction of such coated portions of the fishhook 20 with nearby anodic or cathodic segment 25 or 27.

When used in combination with an artificial lure, such as the rubber worm 23 as illustrated in FIGS. 4 and 5, the present invention provides the rubber worm 23 or other lure that is secured to the fishhook 20 with a simulated bioelectric field such as that associated with natural, living prey. As used herein, the phrase rubber worm 23 indicates any plastic or malleable artificial lure. The rubber worm 23, if made from an electrically insulating material and positioned upon fishhook 20 in the manner depicted in FIGS. 4 and 5, may function as the insulated segment 29. To facilitate such use of the rubber worm 23, the anodic segment 25 is located to one side of where the rubber worm 23 is positioned on the fishhook 20 while the cathodic segment 27 is positioned elsewhere along fishhook 20 separated from the anodic segment 25 by the rubber worm 23.

Moreover as illustrated in FIGS. 4 and 5, to provide weight for the fishhook 20 the anodic segment 25 may be coated over a weighted portion 31 of the fishhook 20 that is made from denser and heavier material. The material forming the weighted portion 31, that underlies the anodic segment 25, may be lead, tin, steel, or another suitable material. It is anticipated that locating the anodic segment 25 on the fishhook 20 forward of the rubber worm 23 and the cathodic segment 27 may be advantageous so the anodic segment 25 precedes the cathodic segment 27 through water surrounding the fishhook 20. Arranged in this way, during retrieval of the fishhook 20 ions entering water from the anodic segment 25 surrounding the fishhook 20 will naturally flow toward the cathodic segment 27.

FIG. 6 illustrates an alternative embodiment fishhook in accordance with the present invention. Those elements depicted in FIG. 6 that are common to the fishhook 20 illustrated in FIGS. 1-5 carry the same reference numeral distinguished by a prime ("'") designation. As depicted in FIG. 6, fishhook 20' includes weighted and enlarged forward weighted portion 31' that is adapted to retain the rubber worm 23'. Accordingly, the weighted portion 31' includes a barb 32 as illustrated in FIG. 6, or by having a corkscrew lure retainer disposed near the eye 204', as on a jig-head or on a Kahle type fishhook. Similar to the fishhook 20 illustrated in FIGS. 4 and 5, the anodic segment 25' of the fishhook 20' illustrated in FIG. 6 overcoats the weighted portion 31'. In comparison with the fishhook 20 depicted in FIGS. 4 and 5, the cathodic segment 27' is located on the opposite side of the rubber worm 23' nearer to the point 208' and the barb 212'.

FIG. 7 illustrates an alternative embodiment fishhook in accordance with the present invention. Those elements depicted in FIG. 6 that are common to the fishhook 20 illustrated in FIGS. 1-5 carry the same reference numeral distinguished by a double prime ("''") designation. As depicted in FIG. 7, the alternative embodiment fishhook 20" includes a wire or plastic weed guard 33. The weed guard 33 connects from immediately adjacent to the eye 204" to just past the point 208" of the fishhook 20". As shown, the fishhook 20" includes the anodic, cathodic, and insulated segments 25", 27" and 29". In the presently preferred embodiment, juxtaposed ends of the anodic, cathodic, and insulated segments 25", 27" and 29" contact each other. If the weed guard 33 is formed from an electrically conductive material, then the fishhook 20" of the presently preferred embodiment is further insulated either or both along the section from the point 208" to immediately adjacent end of the cathodic segment 27 located on the bend 206. Alternatively, if the weed guard 33 is made from metallic wire, e.g. steel, the weed guard 33 may be coated with an electrically insulating material, or the shank 202" of the fishhook 20" may be coated with an electrically insulating material from the eye 204" to the nearest end of the anodic segment 25" located on the shank 202". The insulating material applied to the bend 206" or the shank 202" of the fishhook 20" or to the weed guard 33 is preferably an insulating material having frictional properties similar to those of teflon®, or to those of a nickel teflon mixture. However, it is anticipated that the fishhook 20" or the electrically conductive weed guard 33 will not invariably require electrical insulation just as it is anticipated that the insulated segment 29 is not always required, particularly if an electrically insulating rubber worm 23 were to be suitably attached to the fishhook 20".

FIG. 8a illustrate a basic bait fishhook 20 in accordance with the present invention. As depicted in FIG. 8a, the fishhook 20 includes the anodic segment 25, the cathodic segment 27, and the optional but preferred insulated segment 29 which separates the anodic and cathodic segments 25 and 27. Thus, the present invention provides a baited fishhook that has a simulated bioelectric field associated with natural, living prey. Thus the bait fishhook 20 in accordance with the present invention enhances bait detection and attractiveness, increases fish strikes, and increases catch. FIG. 8b depicts the fishhook 20 depicted in FIG. 8a with exaggerated outlines for the anodic, cathodic, and insulated segments 25, 27 and 29. As illustrated in FIG. 8b, the cathodic segment 27 may extend to the point 208 of the fishhook 20. FIG. 8c depicts an alternative embodiment of the fishhook 20 of FIG. 8a that omits the insulated segment 29 where the anodic and cathodic segments 25 and 27 are separated by an untreated section of the shank 202. FIG. 8d illustrates the fishhook 20 in the form of a circle fishhook that is widely used in commercial long-line fishing as well as in sport fishing.

FIGS. 9a-c respectively illustrate alternative embodiment artificial lures, in this instance rubber worms, in accordance with the present invention. Those elements depicted in FIGS. 9a-c that are common to the rubber worm 23 illustrated in FIGS. 2-5 carry the same reference numeral distinguished by a triple prime ("'''") designation. As illustrated in FIG. 9a, the rubber worm 23''' includes a plurality of fine, electrically conductive strands 53, preferably very fine metallic wires. A central segment of each conductive strand 53 is embedded within a body 54 of the rubber worm 23''' while opposite ends of each conductive strand 53 protrude from the rubber worm 23''' at or near the separated ends thereof. The protruding segments of the conductive strands 53 establish hairlike skirts 55 and 57. As indicated in FIG. 9a, those segments of the conductive strands 53 protruding from the body 54 that form the skirts 55 and 57 are treated in accordance with the present invention to respectively establish the anodic and cathodic segments 25''' and 27'''. Separating the anodic and cathodic segments 25''' and 27''' is the insulated segment 29''' provided by electrically insulating material used to form the body 54. Consequently, upon immersion in water the rubber worm 23'''' creates an electric field that simulates the natural bioelectric field of living prey which sport fish employ in detecting the lure, convincing the fish the lure is a live and viable prey, and inducing a violent strike response. FIG. 9b depicts a conventional fishhook 59 together with the rubber worm 23''' with the fine protruding hairlike conductive strands 53 lying against an outer surface of the body 54 as will likely occur as the rubber worm 23''' moves through water, especially during retrieval of the rubber worm 23'''.

FIG. 9c illustrates an alternative embodiment artificial lure, again a rubber worm, in accordance with the present invention. For the embodiment of the rubber worm 23''' illustrated in FIG. 9c, the anodic, cathodic, and insulated segments 25''', 27''' and 29''' are formed as cylinders that are mechanically secured together by mating male and female couplers 51a and 51b. In accordance with the present invention, an springy electrical conductor included in the insulated segment 29''' may interconnect the anodic and cathodic segments 25''' and 27''' Similarly, end pieces 52a and 52b of the rubber worm 23''', that are formed from a synthetic polymeric material or rubber, are correspondingly secured respectively to the anodic and cathodic segments 25''' and 27''' by male and female couplers 51a and 51b.

FIG. 10 depicts an alternative rubber worm 23''' to that illustrated in FIG. 9a. The rubber worm 23'' illustrated in FIG. 9b includes only a single metallic or conductive strand 53. Similar to the rubber worm 23''' depicted in FIG. 9a, the single conductive strand 53 of the rubber worm 23''' depicted in FIG. 9b includes the anodic and cathodic segments 25''' and 27''', while the material forming the body 54 again provides the insulated segment 29'''.

FIGS. 11, 11a and 11b respectively illustrate yet other alternative embodiment artificial lures in accordance with the present invention. Those elements depicted in FIGS. 11 and 11a-c that are common to the rubber worm 23''' illustrated in FIGS. 9a, 9b and 10 carry the same reference numeral distinguished by a quadruple prime ("''''") designation. The rubber worm 23'''' depicted in FIG. 11 includes the conductive strand 53'''' which is anchored into the body 54'''' and which provides the anodic and cathodic segments 25'''' and 27'''' in accordance with the present invention. In the illustration of FIG. 11 the conductive strand 53 is formed as a lure spear or other piece of hardware adapted to be speared through or tied to or about an artificial lure, such as the rubber worm 23''''or to or about any natural bait.

FIG. 11c illustrates an alternative embodiment of the conductive strand 53'''' formed into a U-shaped lure spear thereby adapting the conductive strand 53'''' for piercing through the rubber worm 23''''. The lure spear depicted in FIG. 11c may include numerous individual conductive strands 53'''' or be formed by a single, larger diameter conductive strand 53''''. In the embodiment depicted in FIG. 11c, the conductive strand 53'''' has the anodic and cathodic segments 25 and 27 located respectively on parallel arms of the U-shaped conductive strand 53''''. Alternatively, the lure spear may be spiraled for better bait retention, and may be disposed alongside the fishhook 59 if a conventional fishhook were used.

FIG. 11a illustrates an alternative apparatus and method for creating a bioelectric rubber worm type lure. The rubber worm 23'''' illustrated in FIG. 11a includes an anodic segment 25'''' which is made by including zinc or magnesium or another highly anodic substance into a sponge-like material that forms a section of the body 54''''. Analogously, the cathodic segment 27'''' is made by including graphite or another highly cathodic substance into a sponge-like material that forms another section of the body 54''''. The cathodic segment 27'''' and anodic segment 25'''' are separated from each other by electrically insulating material that forms a section of the body 54'''' between the anodic and cathodic segments 25'''' and 27''''. The anodic and cathodic segments 25'''' and 27'''' are preferably also electrically interconnected by an electrical conductor 22, in this instance preferably a conductive synthetic material such as a conductive plastic or polymer, or alternatively a metal strand or wire. The material forming the body 54'''' of the rubber worm 23'''' about the electrical conductor 22 is electrically insulating thereby providing the insulated segment 29''''. The respective anodic and cathodic segments 25'''' and 27'''' can be formed by injection molding a sponge-like plastic or synthetic material which carries the respective cathodic or anodic materials. In another method of manufacture, the distinct anodic and cathodic segments 25'''' and 27'''' are established by sequentially pouring into a mold a sponge-like plastic or synthetic material which carries the respective cathodic or anodic materials. The electrical conductor 22 may be established by appropriately pouring a conductive polymeric material in an appropriate portion and into a suitable location where it is surrounded by the insulated segment 29''''.

FIG. 11b illustrates an alternative artificial lure, also known as a soft plastic type lure, formed in the shape of a crayfish 35. As depicted, claws 37 of the crayfish 35 provide the anodic segment 25'''' and carry anodic material disposed in a sponge-like synthetic polymeric material. The anodic body segments are connected via the electrical conductor 22 to the cathodic segment 27'''' located within sponge-like synthetic polymeric material forming a section of a body 39 of the crayfish 35. The anodic and cathodic materials may be dispersed as particles within sponge-like material that forms at least a section of the body of an artificial lure. It is anticipated that those section of the crayfish 35 that contain the anodic and cathodic segments 25'''' and 27'''' preferably lack any impregnated or encapsulated oils. The body 39 of the crayfish 35 may also include a hollow cavity 41 that may be filled with a scent providing mixture, either during manufacture or at time of use by the fisherperson.

Alternatively, for the rubber lures of FIGS. 11a and 11b above, the anodic and cathodic segments 25'''' and 27'''' may also be coated upon surfaces of the rubber worm 23'''' or crayfish 35 in appropriate locations, such as may be accomplished by mixing them with a relatively porous paint or coloring. To facilitate a surface coated plastic lures or rubber lures, the main body of the lure may be made of a conductive polymeric material, using any common method of adding additives to such materials to make them conductive, and then applying an insulating coating to create insulated segment 29''''.

While FIGS. 9a, 9b, 10, 11, and 11a all depict the rubber worm 23, rubber or plastic lures having various shapes may incorporate the present invention. For example, rubber or plastic lizards, frogs, crawfish, shad and other fish, as well as rigid lures may be fabricated in accordance with the present invention, as well as lures with fishhooks 20 permanently attached to them. Rubber or plastic lures may also be impregnated and/or coated with scents, and with salts, such as may increase conductivity of the immediate environment in the case of fresh water lures, and may be of any color or color patterns, and have a variety of action providing shapes, for aiding the fish in believing the artificial lure to be a living prey.

To make a catfish bait or a dough type bait in accordance with the present invention, the sponge-like synthetic materials described above may be saturated with flavorings and/or scents. Alternatively, the sponge-like synthetic materials may be replaced by porous dough or food type baits, with anodic and cathodic body segments separated from one another and interconnected by a conductive element as described above for the rubber worm 23 and the crayfish 35. The bait can be of any shape, such as round or cylindrical. The bait may be made with separate portions by injecting or molding the separate anodic, cathodic, and insulated segments 25, 27 and 29 in a single mold, which may also be done in a sequential fashion in the case of a constant flow method. A metallic strand, or steel wool type arrangement of strands, through the bait and connecting the anodic and cathodic body segments should provided an ideal electrical conductor 22. Alternatively, a dough bait may be surrounded by a basket of fine, steel wool type wires, treated so as to have the anodic and cathodic segments 25 and 27.

FIGS. 12a and 12b illustrate an arrangement that employs the fishhook 20 in fabricating an artificial lure in accordance with the present invention. FIG. 12a depicts the fishhook 20 connected about the eye 204 to an electrically conductive item of extension hardware 61. In the illustration of FIG. 12a, the fishhook 20 is entirely or nearly entirely coated or treated in accordance with the present invention to create the anodic segment 25. The extension hardware 61, distal from the fishhook 20, includes a fin 63. If the fishhook 20 as illustrated in FIG. 12a includes the anodic segment 25, then the fin 63 is coated or treated in accordance with the present invention to create the cathodic segment 27, or conversely. FIG. 12b illustrates the fishhook 20 and lure of FIG. 12a where most of the extension hardware 61 between the fishhook 20 and the fin 63 is coated in accordance with the present invention to provide the insulated segment 29. FIG. 12c illustrates an artificial lure, similar to that depicted in FIG. 12a, where the fin 63 of the extension hardware 61 is replaced by a second fishhook 20a. Similar to the fin 63, the fishhook 20a depicted in FIG. 12c is coated or treated in accordance with the present invention to create the cathodic segment 27. FIG. 12d illustrates the fishhook 20 and lure of FIG. 12c where most of the extension hardware 61 between the fishhook 20 and the fin 63 is coated in accordance with the present invention to provide the insulated segment 29. In the illustrations of FIGS. 12c and 12d, the fishhook 20 together with the extension hardware 61 including the fishhook 20a operate similar to the single fishhook 20 illustrated in FIG. 1 for producing an electromagnetic field about the fishhook to induce a strike response in fish.

FIG. 13a illustrates a fishhook 20 made in accordance with the teachings of the present invention that includes more than one bend 206 and point 208, in the illustration of FIG. 13a a treble fishhook. As illustrated in FIG. 13b, facilitated by greatly enlarged outlines of the anodic, cathodic, and insulated segments 25, 27 and 29 on the treble fishhook, one bend 206 of the fishhook 20 includes the anodic segment 25 while another bend 206 includes the cathodic segment 27. Other sections of the fishhook 20 illustrated in FIGS. 13a and 13b, particularly the shank or shanks 202, are preferably coated in accordance with the present invention to create the insulated segment 29.

FIG. 14 illustrates a stick lure 65, shaped as a hard body bait such as a crankbait, that includes a pair of treble fishhooks 20a and 20b which are removably attached to the stick lure 65. The treble fishhook 20a, which during retrieval of the stick lure 65 precedes the other treble fishhook 20b, is preferably coated or treated to create the anodic segment 25. In accordance with the present invention the fishhook 20b is therefore preferably coated or treated to create the cathodic segment 27. The two treble fishhooks 20a and 20b are preferably connected by the insulated electrical conductor 22 that is located inside the stick lure 65. Alternatively, an insulated metallic strand or spring between and attaching to the eyes 204 of the two treble fishhooks 20a and 20b, or between attaching rings (not illustrated in FIG. 14) to which the eyes 204 connect, provides the electrical conductor 22. If the galvanic properties of the treble fishhooks 20a and 20b ceases or diminishes so as to become ineffective, the fishhooks 20a and 20b may be easily replaced. Further, pairs of treble fishhooks 20 treated to respectively provide the anodic and cathodic segments 25 and 27 together with the electrical conductor 22 may be attached at any time between the lure's manufacture and its use to any lure having configuration similar to that depicted in FIG. 14 for the stick lure 65.

FIG. 15 illustrates a bioelectric simulating spoon type lure 67 which has the anodic, cathodic, and insulated segments 25, 27 and 29 all incorporated into a sticker 24. In the illustration of FIG. 15, the sticker 24 has been attached to the spoon type lure 67, and so therefore may be removed after use. The sticker 24 may be made from a piece of conductive metallic foil, such as tin or aluminum foil, that has been treated to establish the anodic and cathodic segments 25 and 27, and has been covered with an insulating coating to establish the insulated segment 29. The conductive foil forming the sticker 24 is coated with an adhesive material on a side opposite to the anodic segment 25. The sticker may include a small pull-tab (not illustrated in FIG. 14) for easy removal, may be of a variety of colors and patterns, and may also include a portion of plastic or other polymeric material that has been impregnated with a fish attractant. The sticker 24 may be made in any shape and pattern, especially so as to be adaptable to any spoon type lure 67 or any crankbait or stick lure 65.

The flat sticker 24 may also be folded or crimped about the shank of a conventional fishhook which also may carry or omit an artificial lure or lure. Alternatively, the sticker 24 may be applied about a tube to be slipped over the eye of a conventional fishhook onto the fishhook's shank. In this way the sticker 24 provides a disposable bioelectric field generating lure that triggers a strike response from fishes.

INDUSTRIAL APPLICABILITY

FIG. 16 illustrates the fishhook 20 connected to an item of extension hardware, which in the illustration of FIG. 16 is a swivel 77 that connects to the eye 204 of the fishhook 20. The swivel 77, which may be made of brass or steel, has been further coated or treated with an anodic substance to generate extension swivel anodic surfaces 85. Alternatively, the entire swivel may be made in accordance with the teachings of the present invention. Consequently, the fishhook 20 depicted in FIG. 17 omits the anodic segment 25 while including both the cathodic segment 27 and the insulated segment 29 provided by the worm rubber worm 23 that is interposed between the cathodic segment 27 and the anodic surfaces 85 formed on the swivel 77. However, such an implementation of the present invention is not preferred as the swivel 77 during use will likely become ensnared in and coated with vegetation thus likely eliminating or rendering ineffective the electro-magnetic field about the combined fishhook 20 and swivel 77 intended to induce a strike response in fish.

Rather, the presently preferred embodiments are those described previously. For purposes of generating the simulated bioelectric effect, the positions of the anodic and cathodic segments 25 and 27 are generally interchangeable. The application of the anodic and cathodic segments 25 and 27, as well as the insulated segment 29, are useful also on weights such as bullet weights and sinkers, as well as on leaders or attractors, and are intended to be included within the scope of the present invention.

It is anticipated that an electro-magnetic field which attracts fishes by simulating the bioelectric field associated with natural, living prey may also be provided by an electret, or polymer battery, especially if the electret or polymer battery is immersed in the water and located on the lure, bait or fishhook 20. Analogously, a magnet or pair of magnets may also produce an electromagnetic field which attracts fishes may by simulating the bioelectric field associated with natural, living prey. It is anticipated that any of these other methods of creating an electric or electro-magnetic field, or any other inexpensive and suitable device or method of creating an electromagnetic field, especially those that are motion independent and do not require an outside power source, and other methods for creating an ionic flow so as to generate an electromagnetic field may provide a suitable alternative to the preferred anodic and cathodic segments 25 and 27 disclosed herein.

Thus, a fishhook 20 or lure may include an electret or polymer battery used as describe above to produce an electro-magnetic field which attracts fishes. Alternatively, a fishhook 20 or lure may include a magnet or a pair of magnets, particularly if the pair of magnets are oriented to establish an extended external magnetic field. In these cases it is anticipated the electret, or the polymer battery, or the magnets described supra may be electrically insulated.

FIG. 17 illustrates the rubber worm type fishhook 20 having an electret 44 disposed about the shank 202 of the fishhook 20. A polymer battery, a magnet, or two or more magnets oriented to establish an extended external magnetic field may replace the electret 44. FIG. 17a shows the rubber worm type fishhook 20 with two opposed magnets 46a and 46b oriented to establish an extended external magnetic field. The outlines of the electret 44 and of the magnets 46a and 46b are greatly exaggerated in FIGS. 17 and 17a, and these items may more suitably comprise a coating on the fishhook 20. One technique that may be employed for creating an electret on the fishhook 20 is to inject electrons into a teflon coating applied to the metal shank 202, perhaps using a device such as that disclosed in U.S. Pat. No. 4,468,282 entitled "Method of Making an Electron Beam Window."

Instead of applying the electret 44 or the magnets 46a and 46b to the fishhook 20, they may also be disposed inside a plastic or rubber lure such as the rubber worm 23 or the crayfish 35. While these techniques are anticipated to produce an electromagnetic fields, the most preferred technique for increasing fishing effectiveness employs the anodic and cathodic segments 25 and 27, particularly in contact with the water being fished in as described above.

FIG. 18 depicts an artificial lure that incorporates the present invention formed as a V-shaped spinner lure 91. The spinner lure 91 includes an eye 93 for attaching the spinner lure 91 to a fishing line and from which, in the illustration of FIG. 18, project upper and lower arms 95 and 97. The spinner lure 91 includes a pair of blade spoons 99a and 99b one of which is secured to an end of the upper arm 95 distal from the eye 93 while the other blade spoon 99b is secured to the upper arm 95 between the eye 93 and the blade spoon 99a. A pair of spacers 101a and 101b are disposed along the upper arm 95 between the blade spoon 99b and the eye 93. The spinner lure 91 also includes a jig head 103 secured to an end of the lower arm 97 distal from the eye 93. A fishhook 20 which, similar to the fishhook 20 depicted in FIG. 16, includes only the cathodic segment 27 is secured to an end of the jig head 103 furthest from the lower arm 97. The spinner lure 91 also includes a tube-shaped anodic segment 105 which surrounds and is crimped onto the lower arm 97 immediately adjacent to the end thereof from which the jig head 103 extends. In the embodiment of the present invention depicted in FIG. 18, the jig head 103 and the anodic segment 105 are, similar to the swivel 77 illustrated in FIG. 16, extension hardware that are coupled to the eye 204 of the fishhook 20.

The spinner lure 91 also includes an interchangeable skirt 107 which includes multiple strands 109 which respectively extend outward from a cylindrically-shaped collar 111 that is secured to the shank 202 of the fishhook 20. The skirt 107 may be of conventional construction and have any desired color. Alternatively, the strands 109 may include metallic, foil metallic, or otherwise conductive strands upon are disposed the anodic and cathodic segments 25 and 27. The collar 111 may function as the insulated segment 29 if one-piece strands 109 pass through the collar 111. In this instance the strands 109 are arranged so the anodic and cathodic segments 25 and 27 lie on opposite sides of the collar 111. Alternatively, the anodic, cathodic, and insulated segments 25, 27 and 29 may be disposed along lengths of the strands 109 extending away from the collar 111. Conventional, multi-strand skirt fabrication methods may be used in fabricating the skirt 107, particularly where the collar 111 is laminated. The skirt 107 depicted in FIG. 18 may be incorporated into a grub skirt, or be used with the spinner lure 91, any jig or jig head, or other artificial lure.

The present invention may also be applied to spinner lures and other rubber worm type lures by adding thereto a trailer fishhook, in a manner similar to that depicted in FIG. 18, or a trailer rod 120, such as that illustrated in FIG. 19a, that incorporate the present invention. The trailer rod 120 includes an eye 121 formed at one end of a shank 123 which provides an opening sufficiently large so the point and barb of the conventional fishhook 59 will pass therethrough as depicted in FIG. 19b. As depicted in FIG. 19a, the trailer rod 120 includes anodic, cathodic, and insulated segments 25, 27 and 29 so the trailer rod 120 provides a conventional artificial lure with a bioelectric field that induces a strike response in fish. Trailer fishhooks 20 or trailer rods 120 in accordance with the present invention may be fabricated either with the eye 204 or eye 121 fully formed, or open so a fisherperson may crimp the eye 204 or eye 121 closed about the bend of the conventional fishhook 59. Since the trailer rod 120 is incapable of physically hooking a fish, it need not possess the mechanical strength required for the fishhook 59. Accordingly, if the trailer rod 120 includes a fully formed eye 121, then the shank 123, in principle, be made partially or entirely from any material, even an electrically insulating material. FIG. 19b depicts a trailer rod 120 in accordance with the present invention retained upon a conventional fishhook 59 by a rubber stopper 125.

As used in the following claims, the word "fishhook" includes not only fishhooks such as the fishhook 20 depicted in FIGS. 1-7, 8a-8d, 13a and 13b, but also includes lures such as illustrated in FIGS. 12a and 12b, the double hook fishing gear depicted in FIGS. 12c and 12d, and the swiveled Although the present invention has been described in terms of the presently preferred embodiment, it is to be understood that such disclosure is purely illustrative and is not to be interpreted as limiting. For example, the present invention not only encompasses the various configurations, attachment and coating techniques expressly disclosed herein. Rather it is intended that the scope of the present invention encompasses all configurations, attachment and coating techniques which produce a strike-response inducing electromagnetic field about fishhooks and lures of the various types disclosed herein. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A bioelectric simulating fishhook comprising:
   a shank having an eye formed at an end thereof, the eye adapting the fishhook for coupling to a fishing line;
   a bend formed at an end of the shank distal from the eye;

a point formed at an end of the bend distal from the shank; and a self-contained bioelectric simulating means which, to induce a strike response in fish, includes an electret and is disposed on the shank.

2. The fishhook of claim 1 wherein said bioelectric simulating means further includes:
   an anodic segment, formed by an anodic material, that is located along the fishhook where said anodic segment becomes exposed to water upon immersion of the fishhook therein; and
   a cathodic segment, formed by a cathodic material, that is also located along the fishhook where said cathodic segment becomes exposed to water upon immersion of the fishhook therein, and that is separated from the anodic segment.

3. The fishhook of claim 2 further comprising an insulating segment, formed by an electrically insulating material, that is located along the fishhook between said anodic segment and said cathodic segment where said insulating segment becomes exposed to water upon immersion of the fishhook therein for insulating the fishhook thereabout from electrical contact with the water.

4. The fishhook of claim 3 further comprising an artificial lure disposed upon the fishhook.

5. The fishhook of claim 4 wherein said artificial lure is made from an electrically insulating material, and both said anodic segment and said cathodic segment are not covered by said artificial lure.

6. The fishhook of claim 4 wherein said artificial lure is made from an electrically insulating material and provides said insulating segment of the fishhook.

7. The fishhook of claim 3 wherein a quantity of anodic material included in the fishhook is less than a quantity of cathodic material included therein.

8. The fishhook of claim 3 wherein said anodic segment overcoats a comparatively heavy, electrically conductive material thereby adding weight to fishhook.

9. The fishhook of claim 3 wherein said anodic segment and cathodic segment are arranged along the fishhook so that during retrieval of the fishhook said anodic segment precedes said cathodic segment through water surrounding the fishhook.

10. The fishhook of claim 2 further comprising an artificial lure disposed upon the fishhook.

11. The fishhook of claim 1 further comprising an artificial lure disposed upon the fishhook.

12. The fishhook of claim 1 wherein said shank adjacent to the eye has an enlarged portion that is larger than said bend and other portions of said shank.

13. The fishhook of claim 12 wherein material forming the enlarged portion is heavier than material of said shank.

14. The fishhook of claim 1 having at least a pair of bends each of which has a point formed at an end of such bend distal from the shank connected thereto.

15. The fishhook of claim 14 wherein said bioelectric simulating means further includes:
   an anodic segment, formed by an anodic material, that is located along a first bend of the bends where said anodic segment becomes exposed to water upon immersion of the fishhook therein; and
   a cathodic segment, formed by a cathodic material, that is also located along a second bend of the bends where said cathodic segment becomes exposed to water upon immersion of the fishhook therein.

16. The fishhook of claim 15 further comprising an insulating segment, formed by an electrically insulating material, that is located about the shank between said anodic segment of the first bend and said cathodic segment of the second bend where said insulating segment becomes exposed to water upon immersion of the fishhook therein for insulating the fishhook thereabout from electrical contact with the water.

17. A bioelectric simulating artificial lure comprising:
   a body; and
   at least one fine strand, said strand having a section secured in said body and at least another section that protrudes out from said body, at least a section of said strand which protrudes from said body having at least a portion of a self-contained bioelectric simulating means which includes an electret and is disposed on said strand to induce a strike response in fish.

18. The artificial lure of claim 17 wherein a treated section of said strand further includes an anodic segment when said strand becomes exposed to water upon immersion of the artificial lure therein.

19. The artificial lure of claim 18 wherein a treated section of said strand also further includes a cathodic segment when said strand becomes exposed to water upon immersion of the artificial lure therein.

20. The artificial lure of claim 19 wherein the cathodic segment of said electrically conductive strand is coupled electrically to said anodic segment of said electrically conductive strand.

21. The artificial lure of claim 17 wherein said body is formed from an electrically insulating material.

22. A bioelectric simulating skirt adapted to be secured to an artificial lure comprising:
   a plurality of fine strands each having at least a portion of a self-contained bioelectric simulating means which includes an electret disposed on at least one of said strands to induce a strike response in fish.

23. The skirt of claim 22 wherein said strands further comprise an insulating segment, formed by an electrically insulating material, that is located along at least one of said strands between an anodic segment and a cathodic segment of the bioelectric simulating means where said insulating segment becomes exposed to water upon immersion of the skirt therein for insulating said strand thereabout from electrical contact with the water.

24. A bioelectric simulating bait spear adapted for attachment to an artificial lure comprising:
   at least one strand adapted for insertion into an artificial lure, said strand having at least a portion of a self-contained bioelectric simulating means which includes an electret disposed on said strand to induce a strike response in fish.

25. The bait spear of claim 24 wherein said strand further comprise an insulating segment, formed by an electrically insulating material, that is located along said strand between an anodic segment and a cathodic segment where said insulating segment becomes exposed to water upon immersion of the bait spear therein for insulating said strand thereabout from electrical contact with the water.

26. The bait spear of claim 24 wherein said strand is U-shaped thereby adapting said strand for piercing through the artificial lure.

27. A bioelectric simulating artificial lure comprising:
   a solid body having at least a portion of a self-contained bioelectric simulating means which includes an electret disposed on said body to induce a strike response in fish.

28. The artificial lure of claim 27 wherein said body is formed from an electrically insulating material.

29. The artificial lure of claim 28 wherein said body further includes electrically conductive material that interconnects an anodic segment with a cathodic segment.

30. The artificial lure of claim 27 wherein an anodic material is embedded within a porous material that forms at least a portion of said body.

31. The artificial lure of claim 27 wherein a cathodic material is embedded within a porous material that forms at least a portion of said body.

32. The artificial lure of claim 27 further comprising a conductivity-enhancing material which becomes exposed to water upon immersion of the artificial lure therein for increasing electrical conductivity of water about the artificial lure.

33. The artificial lure of claim 27 wherein an anodic segment of the artificial lure is replaceable.

34. The artificial lure of claim 33 wherein a replaceable fishhook provides the anodic segment of the artificial lure.

35. The artificial lure of claim 27 wherein a cathodic segment of the artificial lure is replaceable.

36. The artificial lure of claim 35 wherein a replaceable fishhook provides the cathodic segment of the artificial lure.

37. A bioelectric simulating sticker adapted to be fastened to an artificial lure comprising:
   a sheet of material that includes securing means for fastening said sheet to the artificial lure, said sheet having a self-contained bioelectric simulating means which includes an electret disposed thereon to induce a strike response in fish.

38. The artificial lure of claim 37 wherein the securing means is a layer of adhesive material coated onto a surface of said sheet.

39. The artificial lure of claim 37 wherein a portion of said sheet between an anodic segment thereof and a cathodic segment thereof includes an electrically insulating material.

40. A bioelectric simulating fishhook comprising:
   a bend;
   a point formed at a first end of the bend;
   a shank extending from a second end of the bend distal from said point, said shank also having an eye formed at an end thereof that is distal from the bend;
   extension hardware coupled to the eye that adapts the fishhook for coupling to a fishing line; and
   self-contained bioelectric simulating means on the fishhook, said bioelectric simulating means including an electret to induce a strike response in fish.

41. The fishhook of claim 40 wherein said bioelectric simulating means further includes:
   an anodic segment, formed by an anodic material, that is located on the extension hardware where said anodic segment becomes exposed to water upon immersion of the fishhook therein; and
   a cathodic segment, formed by a cathodic material, that is located along the fishhook separated from said extension hardware where said cathodic segment becomes exposed to water upon immersion of the fishhook therein.

42. The fishhook of claim 41 further comprising an insulating segment, formed by an electrically insulating material, that is located along the fishhook between said anodic segment and said cathodic segment where said insulating segment becomes exposed to water upon immersion of the fishhook therein for insulating the fishhook thereabout from electrical contact with the water.

43. A bioelectric simulating trailer rod adapted to be secured to a bend of a fishhook, the trailer rod comprising:
   a shank adapted for having an eye formed at one end thereof for securing the trailer rod to the bend of the fishhook; and
   self-contained bioelectric simulating means located on the trailer rod, said bioelectric simulating means including an electret to induce a strike response in fish.

44. The trailer rod of claim 43 wherein said bioelectric simulating means further includes:
   an anodic segment, formed by an anodic material, that is located on the trailer rod where said anodic segment becomes exposed to water upon immersion of the trailer rod therein; and
   a cathodic segment, formed by a cathodic material, that is located on the trailer rod separated from the anodic segment where said cathodic segment becomes exposed to water upon immersion of the trailer rod therein.

45. The trailer rod of claim 44 wherein said shank is electrically conducting.

46. The trailer rod of claim 45 further comprising an insulating segment, formed by an electrically insulating material, that is located along the trailer rod between said anodic segment and said cathodic segment where said insulating segment becomes exposed to water upon immersion of the trailer rod therein for insulating the trailer rod thereabout from electrical contact with the water.

47. The trailer rod of claim 44 wherein said shank has an eye formed thereon which provides an opening sufficiently large so the point and barb of a fishhook will pass therethrough.

* * * * *